United States Patent
Buller

(10) Patent No.: US 7,924,853 B1
(45) Date of Patent: Apr. 12, 2011

(54) METHOD OF MAINTAINING A COMMUNICATION NETWORK

(75) Inventor: Victor Anthony Buller, Grandview, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 387 days.

(21) Appl. No.: 11/867,398

(22) Filed: Oct. 4, 2007

(51) Int. Cl.
*H04L 12/56* (2006.01)

(52) U.S. Cl. ........ 370/401; 370/389; 370/352; 370/409; 370/230; 379/333; 379/243

(58) Field of Classification Search .................. 370/409, 370/352, 389, 395, 395.1; 179/18.02; 379/121.01, 379/220.01, 333
See application file for complete search history.

(56) References Cited

U.S. PATENT DOCUMENTS

| | | | | |
|---|---|---|---|---|
| 3,555,196 | A * | 1/1971 | Singer | 379/243 |
| 6,519,337 | B1 * | 2/2003 | Koo et al. | 379/333 |
| 2002/0031215 | A1 * | 3/2002 | You et al. | 379/230 |
| 2002/0057693 | A1 * | 5/2002 | Gallant | 370/395 |
| 2002/0159442 | A1 * | 10/2002 | Quigley et al. | 370/352 |
| 2003/0215073 | A1 * | 11/2003 | Culli et al. | 379/121.01 |
| 2004/0202159 | A1 * | 10/2004 | Matsubara et al. | 370/389 |
| 2006/0072593 | A1 * | 4/2006 | Grippo et al. | 370/409 |
| 2007/0115941 | A1 * | 5/2007 | Patel et al. | 370/352 |

OTHER PUBLICATIONS

Include Software Consulting Inc.; "Omnibox General Features;" 8 pages; Mar. 12, 2004; Miami Lakes, Florida; http://www.includesoft.com/include/chapter_7.htm.
Include Software Consulting Inc.; "The Hung Trunk Detector;" 10 pages; Mar. 12, 2004; Miami Lakes, Florida; http://www.includesoft.com/include/chapter_7.htm.

* cited by examiner

*Primary Examiner* — Robert W Wilson
*Assistant Examiner* — Mohamed Kamara

(57) ABSTRACT

A method is provided for maintaining a communication network including a plurality of call processors, a plurality of packet gateways, and a plurality of trunk groups connected to each packet gateway. Queries are transferred to at least one call processor of the plurality of call processors, and responses are received from the one call processor. The responses are processed to associate the one call processor with a packet gateway and to associate the packet gateway with trunk groups connected to the packet gateway. The association of the packet gateway with the trunk groups is displayed, and a user selects one of the trunk groups. Then an instruction is transferred to the one call processor to seize and release the user-selected one of the trunk groups.

17 Claims, 3 Drawing Sheets

100 Call Processor 1
101 SS7 Links to Originating Call Processor 2
102 Call Processor 2
103 Bearer path to Gateway 1
104 Gateway 1
105 Bearer path to Gateway 2
106 Gateway 2
107 Gateway 1 control path
108 Gateway 2 control path
109 MF Trunk Group to PSAP
110 PSAP switch
111 FG-D to Call Processor 3
112 SS7 Links to Call Processor 3
113 Call Processor 3
114 FG-D to Call Processor 4
115 SS7 Links to Call Processor 4
116 Call Processor 4

300 Example of Maintenance Processor MFWinker record

METHOD OF MAINTAINING A COMMUNICATION NETWORK

TECHNICAL FIELD

The present invention relates to the field of communications and in particular relates to a method of maintaining a communication network.

TECHNICAL BACKGROUND

When maintenance work is being performed on packet voice gateways it is difficult to correlate the gateways to trunks that run through them. It was discovered that trunks including trunks carrying emergency traffic (E911) can go into a lockout state during maintenance. Without knowing which trunks or trunk groups are mapped through a particular (packet voice) gateway all circuits provisioned in the core of a network have to be seized and released ("winked") after a maintenance procedure. This is a time consuming procedure as there can be over a hundred circuits to be "winked" at a time.

TECHNICAL SUMMARY

Generally described, a method is provided for maintaining a communication network including a plurality of call processors, a plurality of packet gateways, and a plurality of trunk groups connected to each packet gateway. Queries are transferred to at least one call processor of the plurality of call processors, and responses are received from the one call processor. The responses are processed to associate the one call processor with a packet gateway and to associate the packet gateway with trunk groups connected to the packet gateway. The association of the packet gateway with the trunk groups is displayed, and a user selects one of the trunk groups. Then an instruction is transferred to the one call processor to seize and release the user-selected one of the trunk groups.

Another embodiment describes an apparatus for maintaining a communication network including a plurality of call processors, a plurality of packet gateways, and a plurality of trunk groups connected to each packet gateway. The apparatus comprises a first transferring system configured to transfer queries to at least one call processor of the plurality of call processors. Then, a first receiving system is configured to receive responses from the one call processor. A processing system is configured to process the responses to associate the one call processor with a packet gateway and to associate the packet gateway with trunk groups connected to the packet gateway. Further, a displaying system is configured to display at least the association of the packet gateway with the trunk groups. A second receiving system is configured to receive a user selection of one of the trunk groups. A second transferring system is configured to transfer an instruction to the one call processor to seize and release at least the user selected one of the trunk groups.

In yet another embodiment, a method is provided for carrying out maintenance work on a gateway. A call processor associated with the gateway is selected. Then, trunk group information is retrieved from the trunk group provisioning records held in a database of the call processor, and the trunk groups are parsed out by their types. The gateway controller to gateway information is retrieved from a gateway controller provisioning record held in the database of the call processor. The gateway controllers are mapped to packet gateways and packet gateways are mapped to trunk groups on the gateways by trunk types. The results of the mapping are then displayed. The gateway and multi-frequency (MF) trunk groups of that gateway are selected to be winked or reset after the gateway maintenance is performed. An automated winking process is started to seize and release all members of an MF trunk group on the selected gateway, and a confirmation message is received upon completion of the automated winking process.

In another embodiment, a computer readable medium has stored thereon sequences of instructions for maintaining a communication network including a plurality of call processors, a plurality of packet gateways, and a plurality of trunk groups connected to each packet gateway. The sequences of instructions include instructions for performing a series of steps. First, queries are transferred to at least one call processor of the plurality of call processors, and a response is received from the one call processor. Second, the responses are processed to associate the one call processor with a packet gateway and to associate the packet gateway with trunk groups connected to the packet gateway. Third, the association of the packet gateway with the trunk groups is displayed, and a user selection of one of the trunk groups is received. Finally, an instruction is transferred to the one call processor to seize and release at least the user-selected one of the trunk groups.

DETAILED DESCRIPTION

Figure 1:
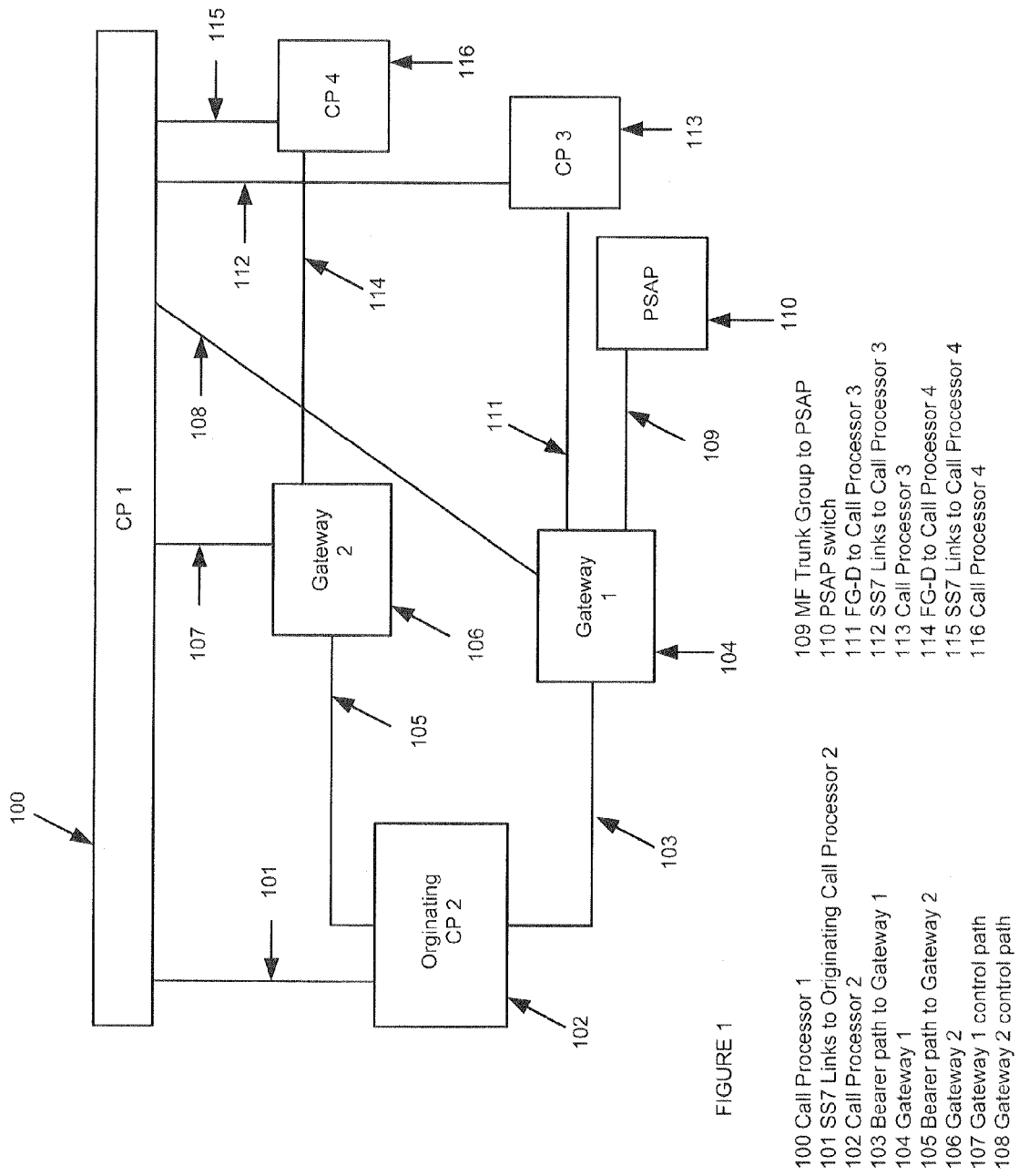
FIG. 1 illustrates a communication network including architecture associated with IP to time division multiplexing (TDMA Voice Gateways in an embodiment.

The communication network shown in FIG. 1 includes call processor 100 for routing calls through the network. Call processor 100 is associated via SS7 links 101 with originating call processor 102.

Call processor 102 is associated via bearer path 103 with gateway 104 and is associated via bearer path 105 with gateway 106. Gateways 106 and 104 are associated with call processor 100 via control paths 107 and 108 respectively.

Gateway 104 is associated via MF trunk group 109 with PSAP (Public Safety Answering Point) switch 110. PSAP switch 110 is responsible for routing emergency traffic (E911) to relevant emergency services (eg. ambulance, police, fire rescue).

Gateway 104 is also associated via FG (Feature Group)-D link 111 with call processor 112. Call processor 112 is associated via SS7 links 113 with call processor 100. Gateway 106 is associated via FG-D link 114 with call processor 115. Call processor 115 is associated via SS7 links 116 with call processor 100.

When periodic maintenance is carried out on gateways in the communication network shown in FIG. 1 that have multiple types of trunks (eg. SS7, MF, DAL, ISDN etc) including MF trunks such as MF trunk group 109 to PSAP switch 110, there is a substantial risk that the trunks may hang in a lockout state. Call attempts via the MF trunks subsequently will not complete and in the past this was corrected by resetting the entire Gateway which may include more than 100 separate circuits many of which are not of the MF type.

It would be much more efficient and less time consuming if MF type trunks such as MF trunk group 109 could be identified as belonging to a particular gateway prior to maintenance being carried out on that gateway since it would then be necessary to seize and release only the MF trunk group members on the gateway. The present embodiment may provide a method for obtaining information to identify which trunk groups are associated with particular gateways prior to maintenance being carried out on the gateways.

Figure 2:
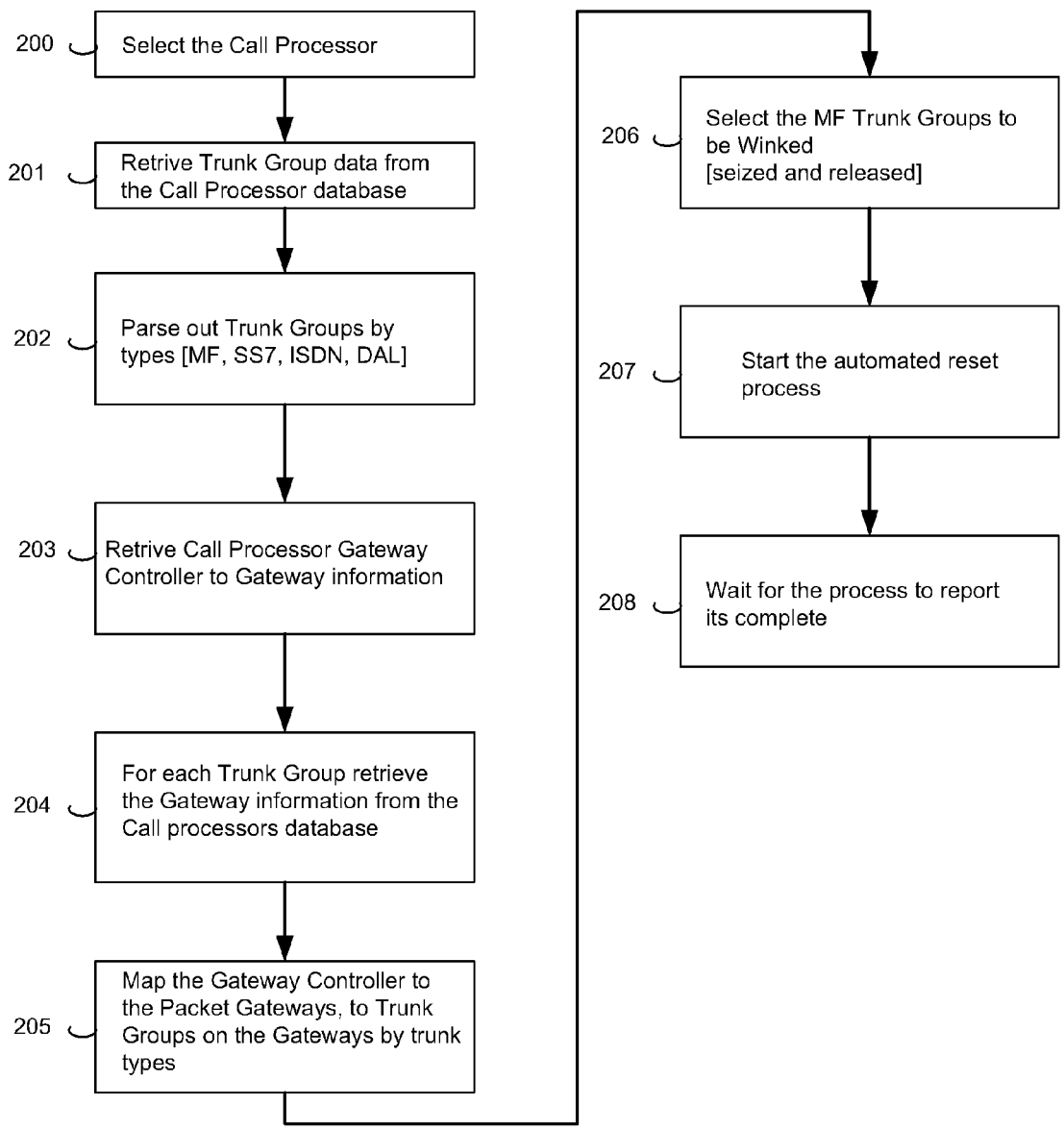
FIG. 2 illustrates an example of a process for extracting data from a communication system in an embodiment.

Referring to FIG. 2 the method of the present embodiment may include the following steps prior to maintenance work being carried out on a gateway: selecting a call processor associated with the gateway (200); retrieving trunk group information (data) from trunk group provisioning records held in a database of the call processor (201); parsing out trunk groups by their types (eg. MF, SS7, ISDN, DAL etc.) (202); retrieving gateway controller to gateway information from gateway controller provisioning records held in the database of the call processor (203); retrieving gateway information for each trunk group from the database of the call processor (204); mapping gateway controller(s) to packet gateways and packet gateways to trunk groups on the gateways by trunk types and displaying the results (205); after gateway maintenance is performed selecting the gateway and MF trunk groups of that gateway to be winked or reset (206); starting an automated winking process to seize and release all members of an MF trunk group on the selected gateway (207); and receiving a confirmation message that the automated winking process is complete (208).

The process of the present embodiment may be used to display gateway trunking information for trunks, eg. SS7, DAL and ISDN other than MF type trunks.

Figure 3:
FIG. 3 illustrates one example of data extracted from a communication system in an embodiment.

An example of gateway trunking information retrieved by the method of the present embodiment is shown in table 300 of FIG. 3. Table 300 indicates that responses received from Gateway Controller 1 indicate that Gateway 1 is associated with Trunk Group A and that Trunk Group A is further associated with Trunk Type MF. Table 300 also indicates that Gateway 1 is also associated with Trunk Group B and that Trunk Group B is further associated with Trunk Type SS7. Table 300 further indicates that Gateway 2 is associated with Trunk Group C and that Trunk Group C is further associated with Trunk Type SS7. Based on the associations mapped in accordance with the record of table 300, it may be necessary to seize and release only Trunk Group A after maintenance is performed on Gateway 1, since Trunk Group A is the only Trunk Group that has an MF type of trunk group associated with it. Because Trunk Group B does not have an MF type of trunk associated with it, it may not be necessary to perform a seize and release operation on Trunk Group B when maintenance is carried out on Gateway 1. Because Gateway 2 does not have any MF type of trunk associated with it, it may not be necessary to perform a seize and release operation on Trunk Group C when maintenance is carried out on Gateway 2.

The process of the present embodiment may be implemented in computer software and run on a computer system such as a general purpose computer, although those skilled in the art will appreciate that programmable or special purpose or dedicated circuitry and equipment may be used. The computer software may include sequences of instructions (computer code) for performing the steps described with reference to FIG. 2.

The computer system may include a communication interface, processing system and a user interface. The processing system may include a computer microprocessor, logic circuit or some other processing device. The processing system may be distributed among multiple processing devices. The processing system may include a storage system including the software. The storage system may include a disk, tape, integrated circuit, server or other memory device. The storage system may be distributed among multiple memory devices. The processing system may be linked to the communication interface and user interface.

The communication interface may include a network interface, modem, port, transceiver and/or other communication device. The communication interface may be distributed among multiple communication devices.

The user interface may include a keyboard, mouse, voice recognition interface, microphone and speakers, a graphical display, touch screen, or other type of user device. The user interface may be distributed among multiple user devices.

The processing system may retrieve and execute software from the storage system. The software may include an operating system, utilities, drivers, networking software and other software typically loaded onto a computer system. The software may include an application program, firmware or other form of machine-readable processing instructions. When executed by the processing system, the software may direct the processing system to operate as described herein.

As described above the method of the present embodiment may be automated by means of suitably implemented computer software. In one form an automated process for seizing and releasing all MF type trunk group members of a specific gateway may be created by using a database associated with the specific gateway and a software development product such as Microsoft.NET. Structure query language (SQL) may be used to retrieve and manage data and for database object access control management.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of maintaining a communication network including a plurality of call processors, a plurality of packet gateways and a plurality of trunk groups connected to each of the plurality of packet gateways, said method comprising:
   transferring queries to at least one call processor of said plurality of call processors requesting trunk group information;
   receiving responses from said one call processor including said trunk group information indicating which of the plurality of trunk groups connect to a Public Safety Answering Point (PSAP);
   processing said responses to associate said one call processor with a packet gateway and to associate said packet gateway with trunk groups connected to said packet gateway;
   displaying at least said association of said packet gateway with said trunk groups and which of said trunk groups connect to the PSAP;
   receiving a user selection of one of said trunk groups that connects to the PSAP; and
   transferring an instruction to said one call processor to seize and release at least the user selected one of said trunk groups.

2. The method of claim 1 wherein indicating which of the plurality of trunk groups connect to a the PSAP is based on trunk types, and wherein displaying which of said trunk groups connect to the PSAP is based on said trunk types.

3. The method of claim 1 wherein the steps of said method are performed by a computer programmed by instructions for performing said steps.

4. An apparatus for maintaining a communication network including a plurality of call processors, a plurality of packet gateways and a plurality of trunk groups connected to each of the plurality of packet gateways, said apparatus comprising:
- a first transferring component configured to transfer queries to at least one call processor of said plurality of call processors requesting trunk group information;
- a first receiving component configured to receive responses from said one call processor including said trunk group information indicating which of the plurality of trunk groups connect to a Public Safety Answering Point (PSAP);
- a processing component configured to process said responses to associate said one call processor with a packet gateway and to associate said packet gateway with trunk groups connected to said packet gateway;
- a displaying component configured to display at least said association of said packet gateway with said trunk groups and which of said trunk groups connect to the PSAP;
- a second receiving component configured to receive a user selection of one of said trunk groups that connects to the PSAP; and
- a second transferring component configured to transfer an instruction to said one call processor to seize and release at least the user selected one of said trunk groups.

5. The apparatus of claim 4 wherein said first receiving component is configured to receive responses indicating which of the plurality of trunk groups connect to the PSAP based on trunk types, and said displaying component is configured to display which of said trunk groups connect to the PSAP based on said trunk types.

6. The apparatus of claim 4 comprising a computer programmed by instructions.

7. A method of carrying out maintenance work on a gateway, said method comprising:
- selecting a call processor associated with said gateway;
- retrieving trunk group information from trunk group provisioning records held in a database of said call processor, wherein said trunk group information indicates which of a plurality of trunk groups connect to a Public Safety Answering Point (PSAP) based on trunk types;
- parsing out said plurality of trunk groups by their trunk types;
- retrieving gateway controller to gateway information from gateway controller provisioning records held in said database of said call processor;
- retrieving gateway information for each of said plurality of trunk groups from said database of said call processor;
- mapping gateway controllers to packet gateways and packet gateways to said plurality of trunk groups on said gateways by said trunk types and displaying results of said mapping;
- after gateway maintenance is performed selecting said gateway and trunk groups that connect to the PSAP of that gateway to be winked or reset;
- starting an automated winking process to seize and release all members of one of the selected trunk groups that connect to the PSAP on said selected gateway; and
- receiving a confirmation message that said automated winking process is complete.

8. The method of claim 7 wherein the selected trunk groups that connect to the PSAP comprise time division multiplexing (TDM) trunks.

9. A non-transitory computer readable storage medium having stored thereon instructions for maintaining a communication network including a plurality of call processors, a plurality of packet gateways and a plurality of trunk groups connected to each of the plurality of packet gateways, wherein when executed by one or more computer system processors on a computer system, the instructions direct the one or more computer system processors to control the computer system to:
- transfer queries to at least one call processor of said plurality of call processors requesting trunk group information;
- receive responses from said one call processor including said trunk group information indicating which of the plurality of trunk groups connect to a Public Safety Answering Point (PSAP);
- process said responses to associate said one call processor with a packet gateway and to associate said packet gateway with trunk groups connected to said packet gateway;
- display at least said association of said packet gateway with said trunk groups and which of said trunk groups connect to the PSAP;
- receive a user selection of one of said trunk groups that connects to a the PSAP; and
- transfer an instruction to said one call processor to seize and release at least the user selected one of said trunk groups.

10. The non-transitory computer readable storage medium of claim 9 wherein said instructions include instructions for receiving said responses to indicate which of the plurality of trunk groups connect to the PSAP based on trunk types, and for displaying which of said trunk groups connect to a the PSAP based on said trunk types.

11. The method of claim 1 wherein the user selected one of said trunk groups comprises a time division multiplexing (TDM) trunk.

12. The method of claim 11 wherein the TDM trunk comprises a multi-frequency (MF) type trunk.

13. The apparatus of claim 4 wherein the user selected one of said trunk groups comprises a time division multiplexing (TDM) trunk.

14. The apparatus of claim 13 wherein the TDM trunk comprises a multi-frequency (MF) type trunk.

15. The method of claim 8 wherein the TDM trunk groups comprise multi-frequency (MF) type trunks.

16. The computer readable storage medium of claim 9 wherein the user selected one of said trunk groups comprises a time division multiplexing (TDM) trunk.

17. The computer readable storage medium of claim 16 wherein the TDM trunk comprises a multi-frequency (MF) type trunk.

* * * * *